United States Patent [19]

Mercede et al.

[11] Patent Number: 5,191,196

[45] Date of Patent: Mar. 2, 1993

[54] APPARATUS FOR ADJUSTABLY SECURING A BAR CODE SCANNER DEVICE USING NYLON HOOK AND LOOP TYPE FASTENERS

[75] Inventors: John J. Mercede, Easton; Edward M. Ifkovits, New Fairfield, both of Conn.

[73] Assignee: Pitney Bowes Inc., Stamford, Conn.

[21] Appl. No.: 430,753

[22] Filed: Nov. 2, 1989

[51] Int. Cl.$^5$ .............. G06K 13/06; G06K 13/24; G06K 13/00; G06K 13/107

[52] U.S. Cl. .............................. 235/484; 235/475; 235/478; 235/486; 250/234

[58] Field of Search ............. 235/475, 470, 462, 484, 235/486, 454; 364/478; 248/205.2; 250/234, 235

[56] References Cited

U.S. PATENT DOCUMENTS

| | | | |
|---|---|---|---|
| 3,555,246 | 1/1971 | Lemelson | 235/475 |
| 3,582,219 | 6/1971 | Pfeifer et al. | 250/235 |
| 3,949,363 | 4/1976 | Holm | 340/146.3 D |
| 4,020,924 | 5/1977 | Conrotto et al. | 235/454 |
| 4,141,044 | 2/1979 | Kistner et al. | 235/475 |
| 4,700,656 | 10/1987 | Cone et al. | 235/462 |
| 4,794,240 | 12/1988 | Scholl et al. | 235/467 |
| 4,854,037 | 8/1989 | DeSanto | 248/205.2 |
| 4,886,957 | 12/1989 | Glaberson et al. | 235/482 |
| 4,970,654 | 11/1990 | Francisco | 364/478 |
| 4,971,177 | 11/1990 | Nojiri et al. | 235/383 |
| 5,005,329 | 4/1991 | Scholl | 235/462 |

Primary Examiner—Stuart S. Levy
Assistant Examiner—Christopher R. Glembocki
Attorney, Agent, or Firm—Charles R. Malandra, Jr.; David E. Pitchenik; Melvin J. Scolnick

[57] ABSTRACT

In an inserter system, an apparatus for bar code scanning includes a scanner, a travel bar attached to a frame of an inserter, and adjustable brackets for slidably fastening said scanner to the travel bar. The travel bar is positioned wherein said scanner is moveable transverse to a paper path travelled by a sheet having a bar code symbol thereon. The apparatus further includes a plate attached to the adjustable brackets, and nylon and hook type fasteners for fastening the scanner to the plate. A transparent medium deck is positioned between the scanner and the paper path. The transparent medium deck is resistive to abrasion and has optical characteristics which would allow scanning by the scanner through the transparent medium deck.

3 Claims, 5 Drawing Sheets

APPARATUS FOR ADJUSTABLY SECURING A BAR CODE SCANNER DEVICE USING NYLON HOOK AND LOOP TYPE FASTENERS

RELATED APPLICATIONS

Reference is made to copending application of the same inventors, entitled "Inserter Having An Apparatus For Protecting A Scanner and Preventing Paper Jams", U.S. patent application Ser. No. 07/430,758, concurrently filed herewith and assigned to Pitney Bowes Inc.

FIELD OF THE INVENTION

The present invention relates to inserter systems employing bar code scanning.

BACKGROUND OF THE INVENTION

It is known to use of bar code symbols printed on an article in many applications. One example of such use of bar code symbols includes printing a bar code symbol on a ticket, tag, or label to be read by a department store clerk using a wand containing a bar code reader. Bar code symbols on items are also read in retail stores having a checkout counter containing a generally X-shaped window under which a flying spot scanner is located. The flying spot scanner is a device in which a beam of light is generated by a laser device and is caused to move within the area of the window for the purpose of reading the bar code symbol located on an article that is moved across the window by a store clerk.

Another type of activity in which bar code symbols are now being used is the processing of mail, such as in the sorting of mail pieces by automated sorters which include bar code readers. It is also known to use bar codes in inserting devices. Examples of such inserters are the model 8300 series inserters available from Pitney Bowes Inc., Stamford, Conn. In these inserters, it is frequently a practice to stack cut sheets having a bar code printed on each sheet. The cut sheets are fed sequentially and the bar code on each sheet, containing control information for the inserter system, is read to determine, for example, how many of the sheets are to be placed on within a given envelope. Once the determination is made as to how many sheets are to be fed together, the sheets are subsequently folded and inserts from feeder stations are added to the sheets and eventually the sheets with inserts are inserted into an envelope.

Prior to the use of bar code symbols in the processing of sheets and inserts by inserters, other forms of control symbols, such as dash-codes, were used in inserters. When inserter systems containing modularized distributed processing, such as the system shown in U.S. Pat. No. 4,547,856 assigned to Pitney Bowes Inc., were introduced dash codes were adequate for use as control symbols on documents. However, the processing of sheets and inserts by inserters has progressed to the point where, for several applications, dash codes cannot contain the sufficient control information. It is well known that bar code symbols can convey more information for a given space occupied by the bar code than a dash code occupying the same amount of space. For more and more inserter applications, bar code symbols are replacing other forms of control symbols.

The use of a bar code scanner in an inserter presents some unique problems, none of which have been experienced in other applications of bar code scanners, such as those described previously. Bar code scanners are generally fixed focal distance scanners. This means that the bar code scanner must be positioned some distance from the path of the sheet being scanned. Unlike a dash code scanner which is positioned in an opening in the inserter deck such that the scan head is part of the deck over which the sheet passes as it is scanned, a bar code scanner must be positioned below the deck a fixed distance from the sheet being scanned. This positioning presents various problems including the collection of dust, which is primarily generated by the paper passing overhead on the bar code scanner head. Generally on inserters such as Pitney Bowes 8300 series inserters, a bar code scanner is permanently attached to the frame of the inserter. To meet the specification requirements of a fixed focal distance scanner, the bar code scanner is positioned an optimum distance below the inserter deck upon which the paper passes over the bar code scanner. Typically, the bar code scanner scans the bar code through a hole, commonly referred to as an "aperture", cut in the deck immediately above the bar code scanner head. The positioning and permanent mounting of the bar code scanner in an inserter is typically a trial and error process requiring, at times, a reworking of the mounting assembly before the scanner is in a position to read a bar code symbol accurately through the aperture.

Generally, for larger inserter systems, such as the Pitney Bowes 8300 series, each inserter is customized to the particular requirements of a customer. It will be appreciated that the positioning of the bar code scanner in each inserter will be dependant upon the forms, and the location of the bar code symbols on such forms, used by each customer, i.e., the bar code scanner station is customized to the customer's requirement. It will be further appreciated that each time a customer changes the forms being used, or changes the location of the bar code symbols on such forms, the bar code scanner must be repositioned, generally requiring a reworking of the bar code scanning station in the inserter including the location and size of the hole in the deck.

It is an object of the present invention to simplify the positioning of the bar code scanner in an inserter.

Another object of the present invention is to provide a scanning apparatus which can be used in a plurality of inserters.

It is a further object of the present invention to eliminate the paper jams caused by the hole in the inserter deck above the bar code scanner.

Other objects, features and advantages of the present invention appear below.

SUMMARY OF THE INVENTION

An improved apparatus and method have been discovered for bar code scanning in an inserter system wherein a bar code scanner is attached to a bar, on which the bar code scanner can be easily adjusted to any position along the bar. The bar code scanner is positioned to scan the bar code symbol on the sheet as the sheet is being transported over the scanner. A means for transporting this sheet on the paper path over the scanner is provided. In accordance with the invention a plate glass deck is positioned above the scanner and slightly below the paper path, the plate glass deck being highly resistant to abrasions and having optical characteristics to allow scanning by the scanner through the plate glass deck.

In a preferred embodiment, nylon hook and loop fasteners are used to attach the bar code scanner to the travel bar and a foam gasket is used provide the optimum distance between the bar code scanner and the plate glass deck.

It has been discovered that the present invention simplifies the positioning and adjustment of a bar code scanner in an inserter. It has also been discovered that an apparatus in accordance with the present invention can be used in a plurality of inserters.

BRIEF DESCRIPTION OF DRAWINGS

FIG. 2b is a top view of the bar code scanner assembly in FIG. 2a.

DETAILED DESCRIPTION

Figure 1:
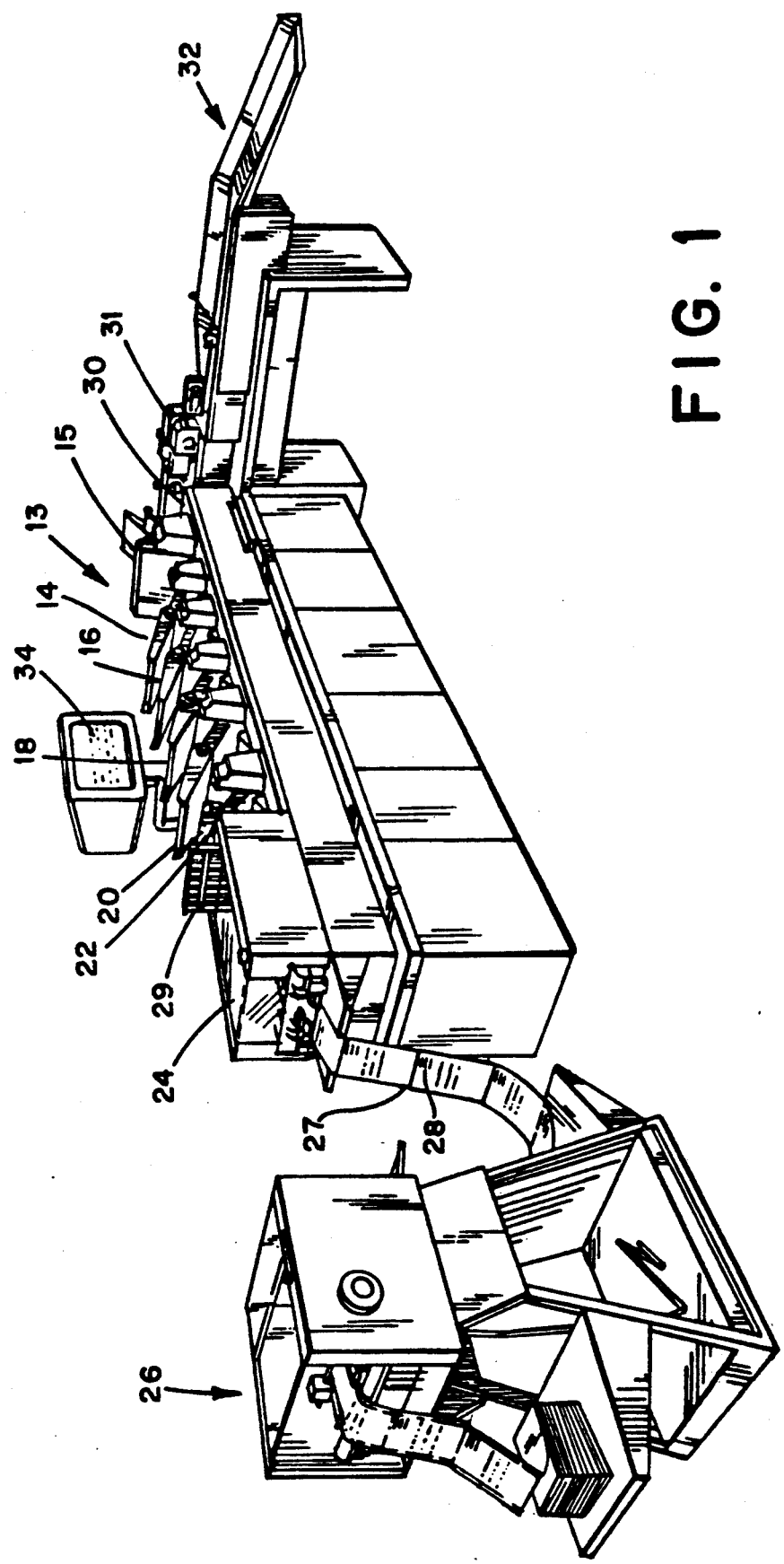
FIG. 1 is an illustration of a prior art inserter system in which the present invention can be practiced.

Referring now to FIG. 1, a document inserter is generally shown at 13. The document inserter 13 includes a plurality of serially arranged modules including an envelope feeder station or module 15 and six document feeder stations or modules, including five feeder modules designated 14, 16, 18, 20, 22, and burster-folder station or module 24. A computer generated forms 26 feeds continuous form control documents 27 having coded marks 28 thereon to the burster-folder 24 for separating and folding. The coded marks 28 on the control documents 27 are sensed by a control scanner 29. Thereafter the serially arranged feeder stations 22, 20, 18, 16 and 14 sequentially feed the necessary documents onto the transport deck 30 at each station as the control document 27 arrives at the respective station to form a precisely collated stack of documents which is to be transferred to the envelope feeder 15.

The use of dash code scanners in an inserter is well known to those skilled in the art. A typical configuration of a dash code scanner in an inserter includes a dash code scanner mounted flush with a deck on which a sheet is transported across deck 2 past the scanner.

Figure 2A:
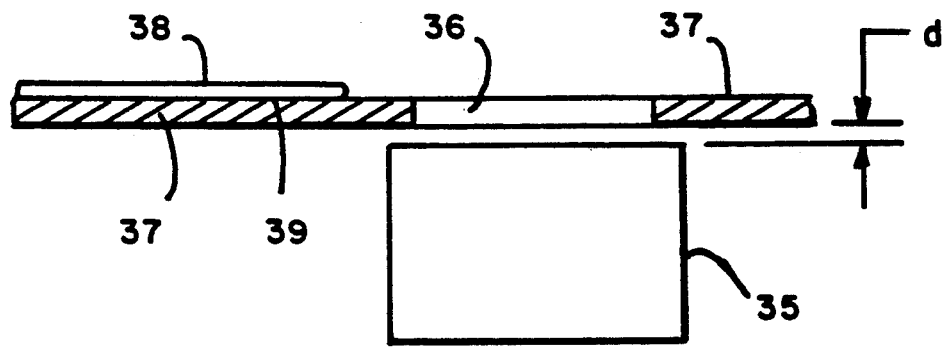
FIG. 2a is a side view diagrammatic representation of a bar code scanner assembly in an inserter such as shown in FIG. 1.

Generally, when a bar code scanner is used in an inserter, the bar code scanner cannot be mounted flush to the deck because a typical bar code scanner is a fixed focal distance type scanner requiring a scan head of the bar code scanner to be a fixed distance, such as 0.3 of inch, from the sheet being scanned. Referring now to FIG. 2a, a typical configuration of a bar code scanner in an inserter is shown with bar code scanner 35 positioned a distanced d below deck 37. Aperture 36 in deck 37 is positioned directly above 20 scanner 35. For further details of such a bar code scanner configuration reference is made to U.S. patent application No. 269,390, filed Nov. 10, 1988, assigned to Pitney Bowes Inc.

Figure 2B:
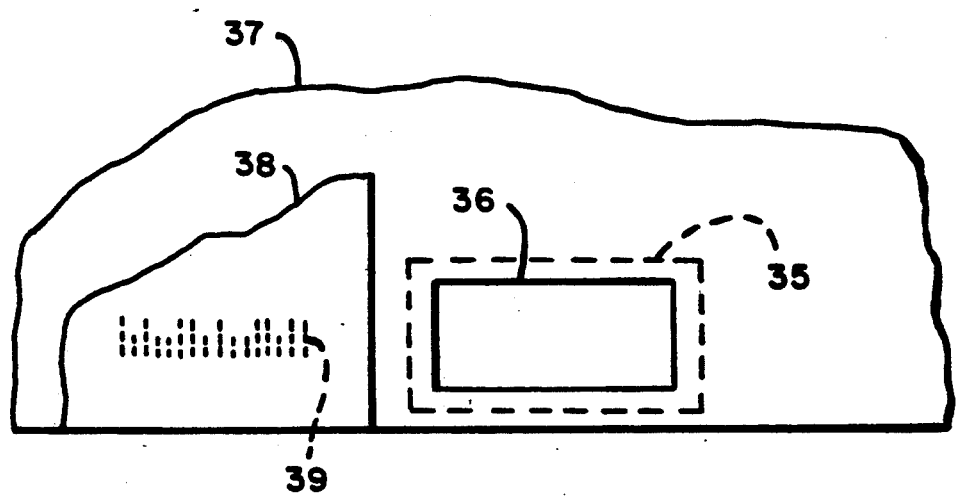

While this arrangement typically works well, it has been found that such a configuration has resulted in various problems affecting the reliability of the scanning process and requiring more maintenance than dash code scanners. Such problems include dust accumulation on scanner 35 and paper flutter as the sheet 38 passes over aperture 36, both causing misreads by scanner 35. Generally, the dust is created by the paper being transported past aperture 36. The paper flutter is a general trait of transporting sheets of paper, such as in an inserter. Another problem is paper jam, which interrupts the processing by the inserter and requires an operator to correct the problem. Referring now to FIG. 2b, a top view of the configuration in FIG. 2a is shown. Generally, a paper jam is caused when the corner of sheet 38 is caught in aperture 36 as sheet 38 passes over aperture 36.

Various methods have been used to alleviate the problems described above. For example, one attempt to alleviate the problem of dust accumulation on scanner 35 includes adding an air nozzle to blow compressed air over scanner 35. The positioning of such air nozzle has been found to be extremely critical because if the compressed air blows through the aperture it will add to the paper flutter problem. A further attempt to alleviate the paper flutter problem included mounting a brush over the aperture wherein bristles of the brush apply a force on the sheet as the sheet passes over the aperture. It has been found that the amount of force applied by the brush and the positioning of the brush are critical. The brush can add to the paper jam problem because the brush must be positioned over or next to the aperture to alleviate the paper flutter problem. Various sized and shaped apertures are used in attempting to reduce the number of paper jams.

The apparatus in accordance with the present invention eliminates such problems entirely. A typical location for the present invention in an inserter is at control scanner 29, or feeders 22, 20, 18, 16, 14 in FIG. 1.

Figure 3:
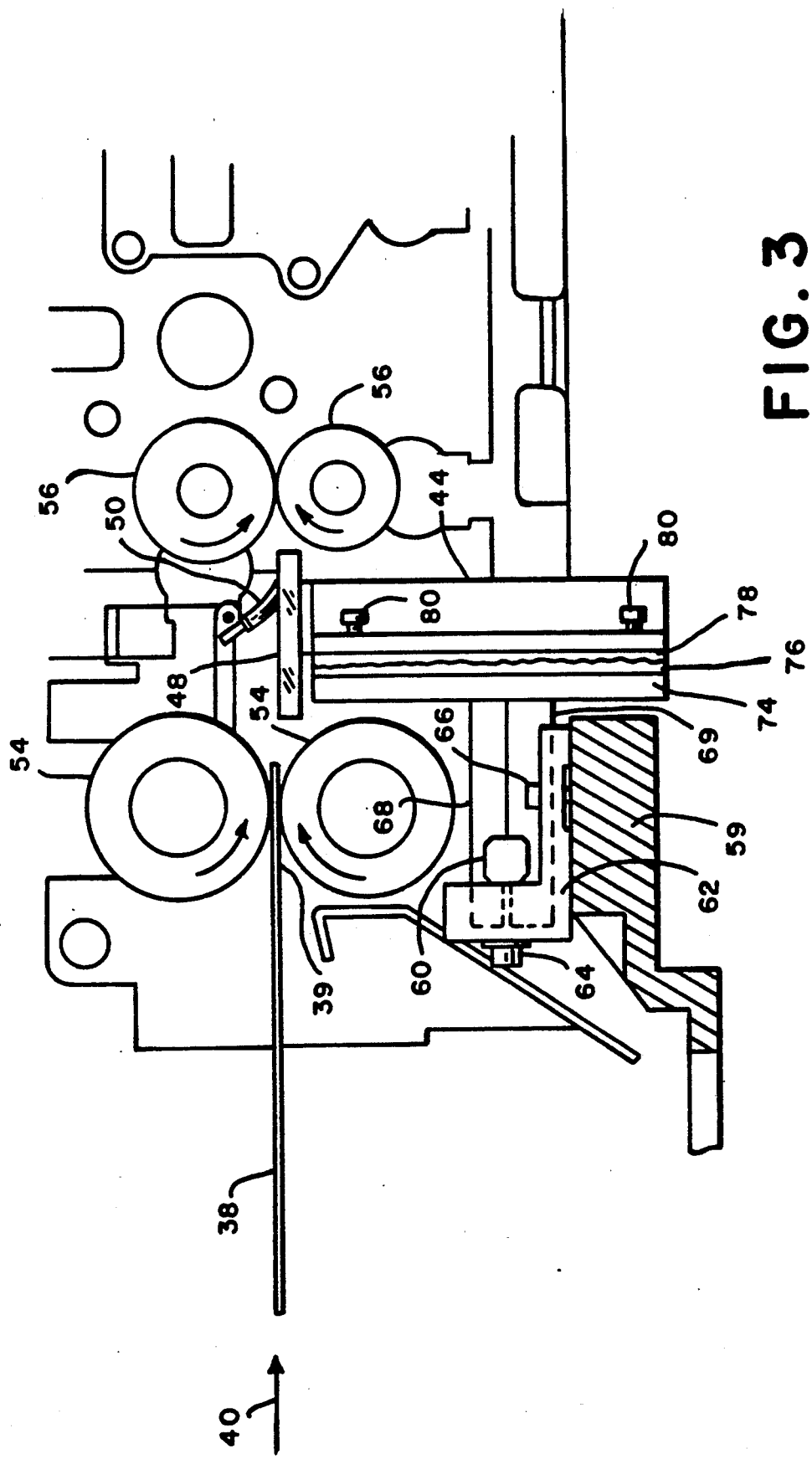
FIG. 3 is a side view of a scanner assembly.

Referring now to FIG. 3, an end view of the scanner assembly of the present invention is shown. In accordance with the preferred embodiment of the present invention, a fixed beam, infrared scanner 44 is shown vertically mounted such that its infrared scan beam passes directly through an optical glass 48. An example of a fixed beam scanner used in the present invention is a S23 Series Fixed Beam Scanner, made by SKAN-A-MATIC Corp. of Elbridge, N.Y., having an LED light source and an optimum range of 0.3 of an inch. It will be understood that any other scanner having a fixed focal distance could be used in the present invention.

From the reflection of the beam off sheet 38 passing over optical glass 48, scanner 44 senses the code 39 printed on sheet 38. As illustrated, sheet 38 is in direct contact with optical glass 48 as sheet 38 is transported between two sets of rollers 54 and 56. The direction of the paper path is shown by arrow 40.

It was believed that the use of a transparent medium positioned between a bar code scanner and a sheet being scanned would interfere with the scanning process. Unlike other applications of bar code scanning, such as in a grocery or department store, bar code scanning in an inserter involves the transporting of paper, which is very abrasive, at speeds which currently can exceed 100 inches per second. The transparent medium must have optical characteristics which do not interfere with the infra red light transmitted by scanner 44 and must have sufficient abrasion resistance to make its use practical in an inserter.

It was found that the optical characteristics of ordinary window glass prevent window glass from transmitting infra red light. It was also found that certain materials, such a polycarbonate sheet like Lexan®, which do transmit the infra red light of scanner 44, lack sufficient abrasion resistance for practical use in an inserter.

An example of an optical glass used in the present invention is Pyrex® plate glass made by Corning Glassware of Corning, New York. Pyrex® plate glass has three times the abrasion resistance of window glass and which transmits short infra red light. It has been found that the plate glass should have a thickness of at least 3/16 of an inch to avoid problems with the glass being too flexible. Actual thickness used will depend on space available in the inserter. It will be understood that any other transparent medium having similar optical characteristics and abrasion resistance could be used. For example, a polycarbonate sheet such as Lexan® could be used.

Figure 4:
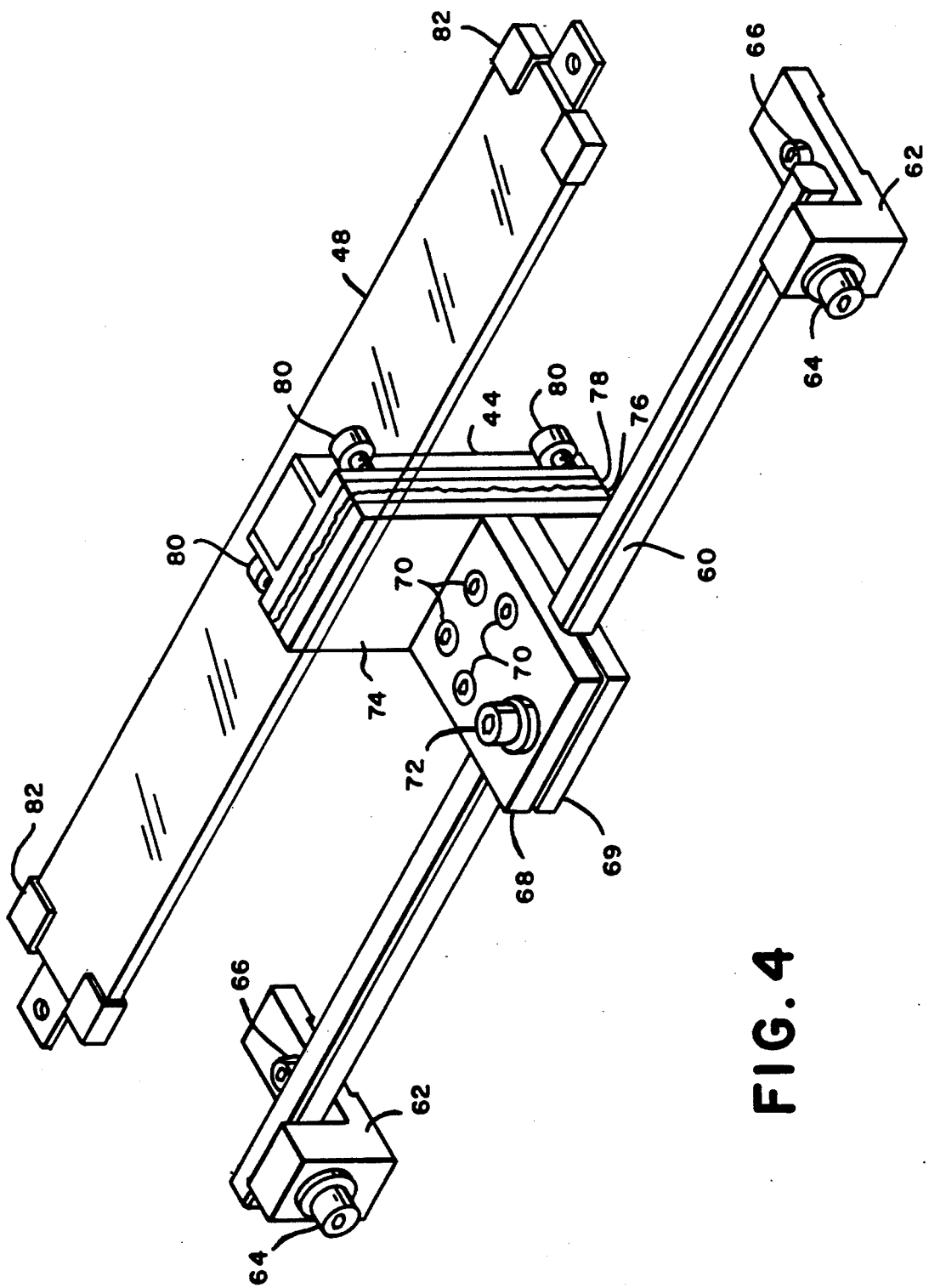
FIG. 4 is an isometric view of a scanner mounting apparatus.

Referring now to FIG. 4, a preferred embodiment of the present invention is shown. A bar 60 is rigidly mounted to a base 59 of an inserter (see FIG. 3) by two brackets 62. Bar 60 is transversely positioned with regard to the direction the paper path (shown in FIG. 3). Each bracket 62 is attached to an end of bar 60 by a screw 64 and to the base by a screw 66. Each bracket 62 has a slotted opening (not shown) through which screw 64 is screwed into bar 60 wherein the vertical position of bar 60 may be adjusted. Brackets 68 and 69 are clamped around bar 60 by screws 70. Brackets 68 and 69 each have a machined groove wherein when brackets 68 and 69 are clamped together by screws 70 a channel is formed through which bar 60 is inserted. An adjustment screw 72 is used to firmly tighten brackets 68 and 69 around bar 60 to hold brackets 68 and 69 in a fixed position. Screw 72 can be loosened to adjust the position of brackets 68 and 69 on bar 60.

Figure 5:
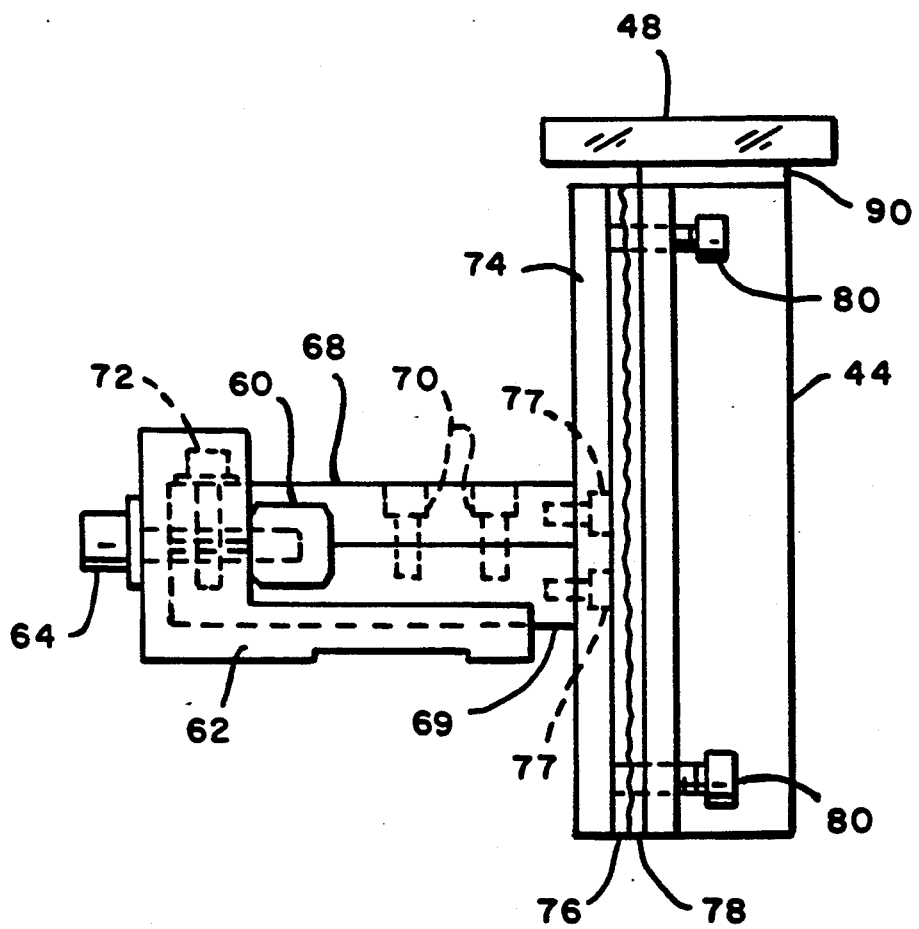
FIG. 5 is a side view of the scanner mounting apparatus in FIG. 4.

One side of plate 74 is attached to brackets 68 and 64 by screws 77 (see FIG. 5). A section of nylon hook fastener tape 76 is adhesively attached to the other side of plate 74. A section of nylon loop fastener tape 78 is adhesively attached to the back of scanner 44. In the preferred embodiment of the present invention, Velcro® brand nylon hook and loop fasteners consisting of two mating tapes, hook #88 and loop #2000, made by Velcro U.S.A. Inc. of Manchester, N.H., are used. It will be understood that any other comparable fastener demonstrating similar properties to the Velcro®brand nylon hook and loop fasteners could be used.

It will be understood that other conventional methods of fastening scanner 44 to plate 74 can be utilized. But it has been found that the use of the nylon hook and loop fasteners 76 and 78 provide a secure method for attaching scanner 44 to plate 74 while permitting substantially unlimited adjustments to the position of scanner 44 with respect to plate 74.

It has been found that the bond between nylon hook and loop fasteners 76 and 78 are strengthened by applying a tension between fasteners 76 and 78 after fasteners 76 and 78 are engaged. In accordance with the preferred embodiment of the present invention, the bond of hook and loop fasteners 76 and 78 are strengthened by four screws 80 which are inserted into four holes located at the corners of the back of scanner 44. Screws 80 are tightened against the back of plate 74 to provide a uniform tension between nylon hook fastener 76 and nylon loop fastener 78. The screws are sized to provide a uniform tension sufficient to stabilize the fastening of scanner 44 to plate 74 wherein scanner 44 is substantially rigid with respect to plate 74. Screws 80 substantially eliminate any twisting type movement, a general characteristic of the nylon hook and loop fasteners while engaged, which would be caused by vibrations in the inserter.

In accordance with the preferred embodiment of the present invention, bar 60 has a cross sectional square or rectangular shape over which brackets 68 and 69 are clamped. It will be appreciated by those skilled in the art, that vibrations occurring during the operation of an inserter can affect critical adjustments made in the positioning of a scanner. While other shapes can be used for bar 60, the square shape has been found to give the best results.

It has been found that the combination of bar 60 and brackets 68 and 69 provide for a reliable and secure horizontal adjustment to the position of scanner 44 which are not affected by vibrations occurring in the inserter. Once secured by tightening screw 72, the scanner cannot be moved in a horizontal direction. Additionally, the shape of bar 60 and the corresponding channel formed by brackets 68 and 69, prevent an skewing of scanner 44. It will be understood that brackets 68 and 69 could be a single bracket having a channel for bar 60 and an adjustment screw 72.

It has also been found that the vertical adjustments to the positioning of scanner 44 to plate 74 are not affected by vibrations. The mating of hook and loop fasteners 74 and 76 provides a secure bond and also provides a dampening effect with regard to such vibrations.

In the preferred embodiment of the present invention, optical plate glass deck 48, is rectangular in shape and has a width of at least the width of the scan head of scanner 44 and a length approximately equal to the length of bar 60. Optical plate glass deck 48 is fastened to the frame of the inserter (not shown) by two brackets 82, one at each end of optical plate glass deck 48. At least one edge of optical plate glass deck 48, the edge facing sheet 38 as sheet 38 moves through rollers 54 (see FIG. 3), is rounded to minimize an occurrence of a paper jam. It has been found that positioning optical plate glass deck 48 slightly below the paper path between sets of rollers 54 and 56 eliminates paper jams over scanner 44. A brush 50 is positioned over optical plate glass deck 48 to apply sufficient force on sheet 38 wherein sheet 38 remains in close contact with plate glass deck 48 as sheet 38 passes by scanner 44. It has been found that this configuration significantly reduces or eliminates paper flutter during the scanning process.

An additional feature of optical plate glass deck 48 is the significant reduction of dust accumulating on the scan head of scanner 44. Referring now to FIG. 5, a side isometric view of the present invention is shown. It has been found that such dust accumulation is eliminated by adding a gasket 90 between scanner 44 and optical plate glass deck 48.

In the preferred embodiment of the present invention gasket 90 is made of foam. An example of the foam used in the present invention is a medium density open cell foam E-200/U made by Illbruck of Minneapolis, Minn. The dimensions of the foam are such that a seal is formed between scanner 40 and optical plate glass 48 without interference with the scanning process. It has been found that an additional benefit of gasket 90 is that if sized properly gasket 90 can facilitate the optimum positioning of the distance between scanner 44 and glass deck 48. The depth of the gasket 90 is sized to provide the optimum distance for scanner 44 when gasket 90 is compressed between scanner 44 and the top of plate glass deck 48.

It will be understood that the plate glass and gasket can be used in conjunction with the stationary scanner configuration in FIG. 2a, wherein the plate glass is used to fill the aperture to prevent paper jams and dust accumulation on the scanner, and the gasket is used to eliminate the dust accumulation.

In addition to the benefits described above, the present invention solves a basic problem confronted with the manufacture of customized inserters. Generally, the scanner station for each inserter has been a customized design to meet the specific requirements of each customer. The present invention can be used in any inserter having a scanner station thus eliminating a new design for each inserter.

Another benefit of the present invention is that it simplifies the initial set-up of the scanner, which generally has included a trial and error procedure and, at times, a reworking of parts in the scanner station. In accordance with the present invention, the scanner 44 is installed and tested to determine if it is positioned correctly. If an adjustment to its position is required, adjustments can be made in the horizontal direction by loosening screw 72 and moving scanner 44 along bar 40. Other adjustments are made by removing scanner 44 from plate 74 and aligning scanner 44 at the correct position. Once the correct position is determined, adjustment screw 72 is tightened, scanner 44 is pressed against plate 74 and screws 80 are tightened to complete the set-up.

While the present invention has been disclosed and described with reference to a single embodiment thereof it will be apparent, as noted above, that variations and modifications may be made therein. It is thus intended in the following claims to cover each variation and modification that falls within the true spirit and scope of the present invention.

What is claimed is:

1. In an inserter system, an apparatus for positioning a bar code scanner across a paper path travelled by sheets having bar code symbols printed thereon, comprising:
   a frame;
   a bar code scanner;
   a travel bar attached to the frame under a paper path, said travel bar extending in a direction transverse to the paper path;
   bracket means for slidably engaging said travel bar said bracket means including a channel through which said travel bar is placed and means for securing said bracket means to said travel bar;
   first and second means for fastening said bar code scanner to said bracket means, wherein said first fastening means comprises nylon hooks and said second fastening means comprises nylon loops, and wherein one of said first and second means is secured to said bar code scanner and the other of said first and second means is secured to said bracket means and wherein said first and second means for fastening is adjusted by tension increasing means wherein the tension increasing means provide substantially uniform tension between the hooks and loops in said first and second means;
   a transparent medium deck situated between said bar code scanner and the paper path, said transparent medium deck extending approximately the width of the paper path, wherein said bar code scanner is transversely positioned at any location along said travel bar at which said bar code scanner reads bar code symbols printed at a corresponding location on sheets conveyed along the paper path;
   gasket means fastened to said scanner for positioning said scanner at an optimum distance from said paper path, said gasket means also sealing a space between said scanner and said transparent medium deck wherein dust is prevented from accumulating on said scanner; and
   wherein loosening and tightening of the tension means allows adjustment of the bar code scanner permitting consistent reading of bar codes.

2. The apparatus according to claim 1 wherein said travel bar has a cross sectional rectangular shape.

3. The apparatus according to claim 1 wherein said transparent medium deck is resistive to abrasion and has optical characteristics for scanning through said transparent medium deck by said bar code scanner.

* * * * *